United States Patent [19]
Price

[11] Patent Number: 5,971,011
[45] Date of Patent: Oct. 26, 1999

[54] WATER SHUT-OFF VALVE AND LEAK DETECTION SYSTEM

[76] Inventor: Stephen Jeffrey Price, 1101 Surrey St., Casper, Wyo. 82609

[21] Appl. No.: 09/027,456

[22] Filed: Feb. 21, 1998

[51] Int. Cl.$^6$ .................................................. F16K 17/20
[52] U.S. Cl. ................ 137/460; 134/487.5; 134/624.12; 134/456; 251/113
[58] Field of Search ............................ 137/487.5, 624.11, 137/624.12, 460, 456; 251/111, 113

[56] References Cited

U.S. PATENT DOCUMENTS

| | | | |
|---|---|---|---|
| 2,926,690 | 3/1960 | Martin | 137/460 |
| 3,294,112 | 12/1966 | Watkins | 137/456 X |
| 3,741,519 | 6/1973 | Moyer | 251/111 |
| 4,658,846 | 4/1987 | Johnson | 137/460 X |
| 4,675,541 | 6/1987 | Peters et al. | 137/624.12 X |
| 4,911,200 | 3/1990 | Ben-Arie | 137/624.12 X |
| 5,287,884 | 2/1994 | Cohen | 137/460 X |
| 5,409,037 | 4/1995 | Wheeler et al. | 137/487.5 X |
| 5,568,825 | 10/1996 | Faulk | 137/624.11 |
| 5,782,263 | 7/1998 | Isaacson et al. | 137/487.5 |

FOREIGN PATENT DOCUMENTS

| 463641 | 5/1951 | Italy | 251/113 |
|---|---|---|---|
| 497287 | 9/1954 | Italy | 251/111 |

*Primary Examiner*—Denise L. Ferensic
*Assistant Examiner*—Ramyar Farid
*Attorney, Agent, or Firm*—Risto A. Rinne, Jr.

[57] ABSTRACT

An apparatus to permit or stop the flow of water through a conduit is described as having a microprocessor which contains a real time clock, day of the week indication, and an elapsed time clock. Data relating to the quantity of water flowing at any given moment is supplied by a flowmeter to the microprocessor. Primary and subsetting information is supplied to the microprocessor to determine the maximum allowable quantity of water that may flow over a specified period of time. The subsetting parameters override the primary information if so enabled and supply replacement information for certain periods of time. The elapsed time clock is reset whenever the flow rate becomes zero (no water flowing) or when the predetermined period of time is exceeded prior to exceeding the predetermined quantity of water that is allowed to flow within that period of time. If the flow of the predetermined quantity of water is exceeded within the predetermined (allowable) time frame, a solenoid is energized. The solenoid moves a plunger which interrupts (stops) the flow of water through the valve. After detecting a fault condition (a leak), a latching mechanism is activated which secures the plunger in the "water off" position, until it is manually reset.

24 Claims, 6 Drawing Sheets

WATER SHUT-OFF VALVE AND LEAK DETECTION SYSTEM

BACKGROUND OF THE INVENTION

1. Field of the Invention

The present invention, in general relates to water valves and, more particularly, to devices that shut off the flow of water automatically upon detecting a fault condition.

Water shut-off valves and systems are known. Some of them are based on monitoring a continuous flow of water. The problem with such a system is that eventually an acceptable continuous flow, such as from a leaking valve in a toilet tank, will accumulate until a fault condition is indicated and shut off the flow of water when, in fact, a serious fault condition does not exist.

Also, certain other types of continuous flow systems are more complex and require that a second flow sensor be installed in a drain line and then connected to the system so as to determine when a protracted or excessive flow of water is nevertheless acceptable, because it is not then believed to be accumulating in the house. This is hardly foolproof as considerable damage may be occurring yet the water may eventually find its way to a drain. Also such a system is more complex to install and to maintain.

Still other known systems do not allow for varying conditions, such as occur during seasonal changes when, for example, a lawn is to be watered in the summer and then only on particular days, or for special situations such as when the family is away from the home on vacation. For example, some of these prior systems specifically require that physical installation of the system occur after water has already been acquired for sprinkler use, thereby rendering the system ineffective in detecting leaks involving the sprinkler system.

Other systems are not well suited for use in commercial installations where potentially high flow rates are likely to occur, and when, during normal use, a continuous flow may be present simply due to many users having intermittent requirements that occasionally result in a protracted uninterrupted continuous flow that can be misinterpreted as a fault condition (leak) that results in stopping the flow of water when it is not desired.

Accordingly, there exists today a need for a water shut-off valve and leak detection system that is immune to a continuous flow of water provided the quantity used is not excessive, is simple to install, is less expensive to manufacture, has settings that adapt to varying water usage patterns, and is suitable for use in commercial buildings as well as in private residences.

Clearly, such an apparatus is a useful and desirable device.

2. Description of Prior Art

Water shut-off valves and systems are, in general, known. For example, the following patents describe various types of these devices:

U.S. Pat. No. 5,000,224 to Olson, Jr., et al, Mar. 19, 1991;
U.S. Pat. No. 5,251,653 to Tucker et al, Oct. 12, 1993;
U.S. Pat. No. 5,267,587 to Brown, Dec. 7, 1993;
U.S. Pat. No. 5,287,884 to Cohen, Feb. 22, 1994;
U.S. Pat. No. 5,409,037 to Wheeler et al, Apr. 25, 1995;
U.S. Pat. No. 5,464,038 to Kruto, Nov. 7, 1995; and
U.S. Pat. No. 5,503,175 to Ravilious et al, Apr. 2, 1996.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a water shut-off valve and leak detection system that is adapted for use in a private residence.

It is also an important object of the invention to provide a water shut-off valve and leak detection system that is adapted for use in a commercial building.

Another object of the invention is to provide a water shut-off valve and leak detection system that is inexpensive to manufacture.

Still another object of the invention is to provide a water shut-off valve and leak detection system that is easier to install.

Still yet another object of the invention is to provide a water shut-off valve and leak detection system that is easier to use.

Yet another important object of the invention is to provide a water shut-off valve and leak detection system that monitors the continuous flow of water for a predetermined period of time and then resets once the time parameter has been exceeded, providing an excessive quantity of flow was not experienced.

Still yet another important object of the invention is to provide a water shut-off valve and leak detection system that includes a plurality of settings which adapt to varying water usage demands.

Even yet another important object of the invention is to provide a water shut-off valve and leak detection system that includes a mechanical latching mechanism to prevent a valve that has been shut off by the system from opening without manual intervention, such as might otherwise occur if there were an electrical power failure.

Even further another especially important object of the invention is to provide a water shut-off valve and leak detection system that includes a valve, microprocessor, timer, flowmeter, switch settings and display in an integral one-piece unit, if desired.

Briefly, a water shut-off valve and leak detection system for use in private residences and commercial buildings that is constructed in accordance with the principles of the present invention has a solenoid controlled valve in line with a water supply line. A flow meter monitors supplies information to a microprocessor regarding the quantity of water flowing through the supply line and also notes when the flow rate drops to zero. The quantity of flow is accumulated by the microprocessor. The microprocessor looks for continuous flow and resets a primary elapsed time clock whenever the flow rate becomes zero. If there is a continuous flow, the microprocessor determines if a programmed primary elapsed time duration has been exceeded. If it has, it resets the elapsed time clock and begins monitoring anew for a repetition of the programmed primary time duration, or for a new real-time interval if this is made applicable by an active subsetting. The microprocessor checks for quantity of flow within the allotted time frame. If the quantity of flow within the given time frame has been exceeded, it energizes the solenoid and stops the flow of water through the supply line from occurring until the system is manually reset. At least one switch is provided for use to enable a subsetting which, if so enabled, can override the main program settings.

DETAILED DESCRIPTION OF THE INVENTION

Figure 1:
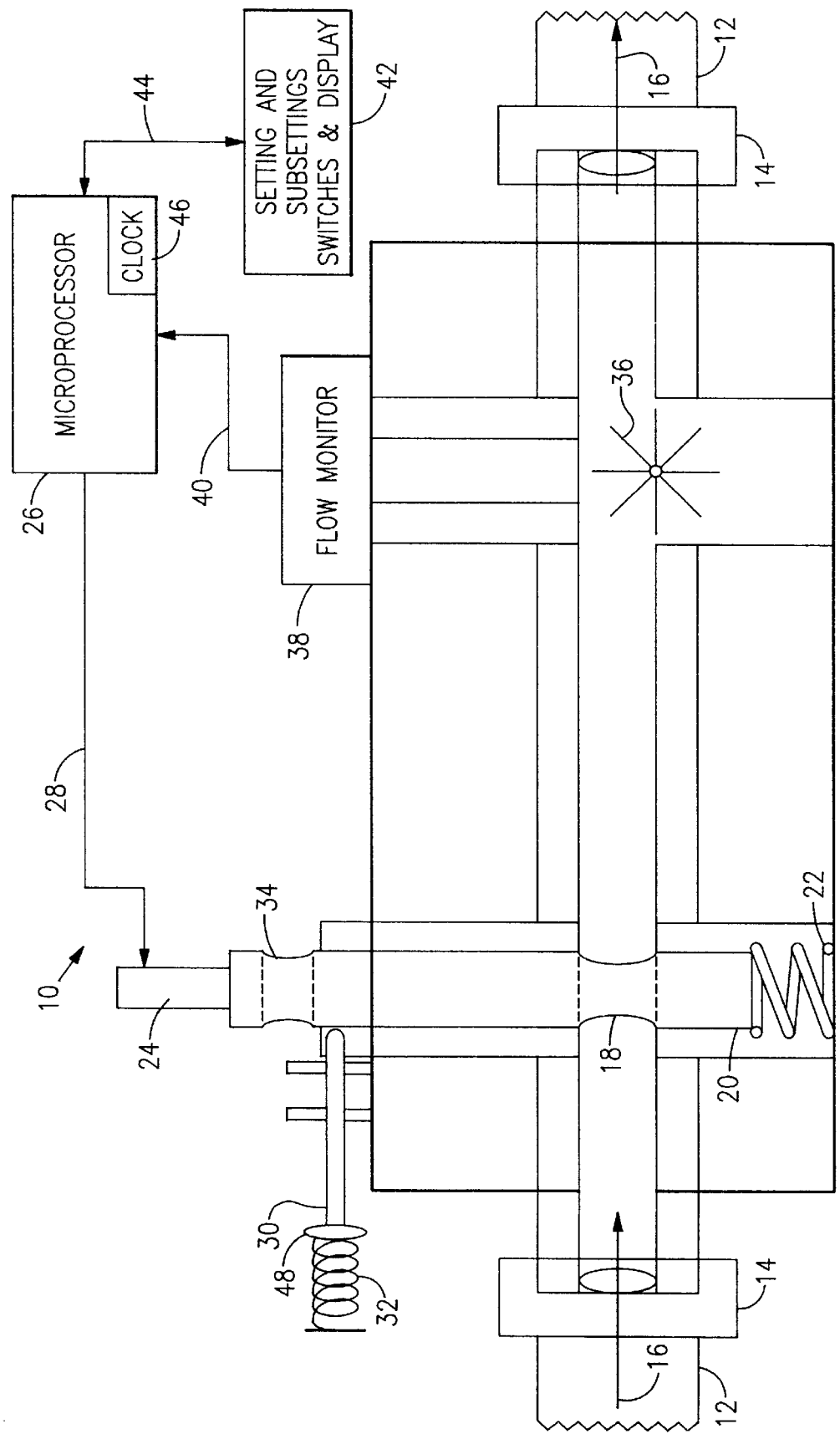
FIG. 1 is a cross sectional view of a valve combined with a block diagrammatic view of a water shut-off and leak detection system disposed in a first position allowing water to flow through the valve.
Figure 2:
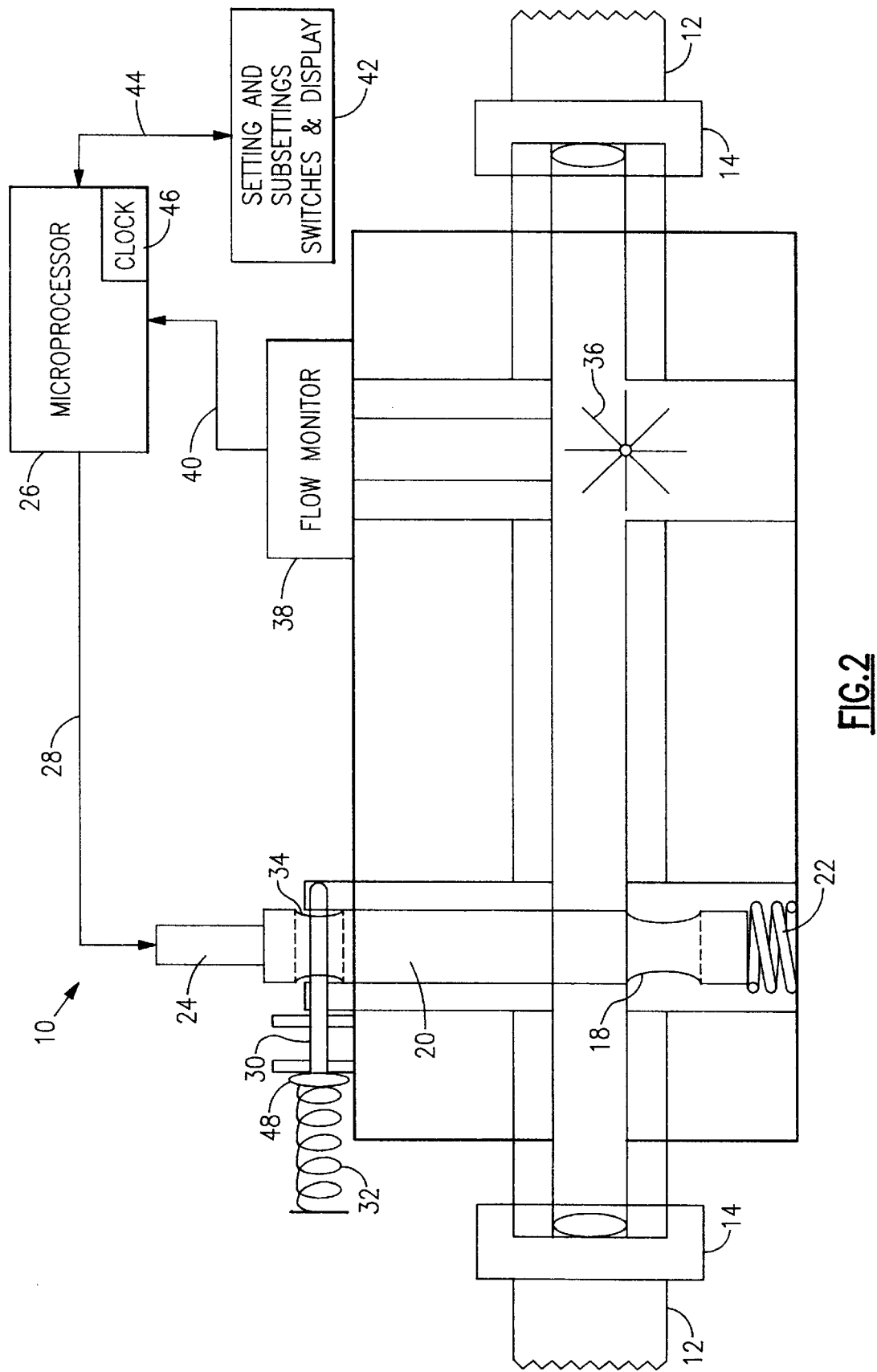
FIG. 2 is the valve of FIG. 1 disposed in a second position preventing water from flowing through the valve.

Referring on occasion to all of the FIGURE drawings and in particular to FIGS. 1 and 2 is shown, a water shut-off valve and leak detection system, identified in general by the reference numeral 10 and referred to hereinbelow as the valve 10. FIG. 1 shows normal operating conditions and is primarily referred to during the next several paragraphs. FIG. 2 shows the condition of the valve 10 when a leak has been detected and the flow of water has been stopped.

A water supply line 12 has been cut, a section has been removed, and the valve 10 has been installed intermediate the supply line 12 by a pair of fittings 14, of the type needed and as are well known to the plumbing arts. A pair of arrows 16 indicate the direction of the flow of water.

Water flows into the valve 10 and through a first opening 18 provided through a plunger 20. A first spring 22 supplies a force which normally keeps the plunger disposed in a first position as is shown in the FIG. 1 drawing, which allows for water flow to occur through the first opening 18 of the plunger 20 and subsequently, through the valve 10.

A solenoid 24 is disposed at the opposite end of the plunger 20 with respect to where the first spring 22 is disposed. The solenoid 24 is normally not energized and therefore does not normally act on the plunger 20. A microprocessor 26, as is described in greater detail hereinafter, includes a control line 28 as an output which is used to energize the solenoid 24 in response to detecting a fault condition.

A fault condition is deemed an excessive consumption of water and may indicate the presence of a rupture in some portion of a water supply and usage system (not shown) causing a leak to occur. The water supply and usage system refers to that portion of the normal plumbing system of a residence or a commercial building that receives water flowing through the supply line 12 and which is disposed after installation of the valve 10.

A retaining pin 30 includes a second spring 32 which supplies a force to the pin 30 that causes it to bear upon the plunger 20 as shown in FIG. 1. The plunger 20 includes a second opening therein 34 that the pin 30 engages when the solenoid 20 is energized, as is shown in the FIG. 2 drawing and is discussed in greater detail hereinafter.

Water normally continues to flow through the first opening 18 of the plunger 20 and along through the valve 10 past a flowmeter 36. The flowmeter 36 includes a data conversion assembly 38 attached to the valve 10 which determines the quantity of water that is flowing through the valve 10 and supplies a continual indication of this information to the microprocessor 26 in a form the microprocessor 26 can use via a first data path 40. The first data path 40 includes as many separate lines, or channels of information, as are required. The flowmeter 36 may employ any desired technology, including acoustic sensing of flow rates.

As is discussed in greater detail hereinafter, the microprocessor 26 uses the information from the flowmeter 36 to determine when a continuous flow of water is occurring and when the normal flow of water ceases.

Water normally flows through the flowmeter 36 and exits the valve 10 where it continues flowing through the supply line 12 and onward to fulfill its final usage downstream along the normal plumbing system. Water may be drawn from a faucet (not shown), or may service an appliance such as a laundry or dish washing machine (not shown), etc.

Figure 4:
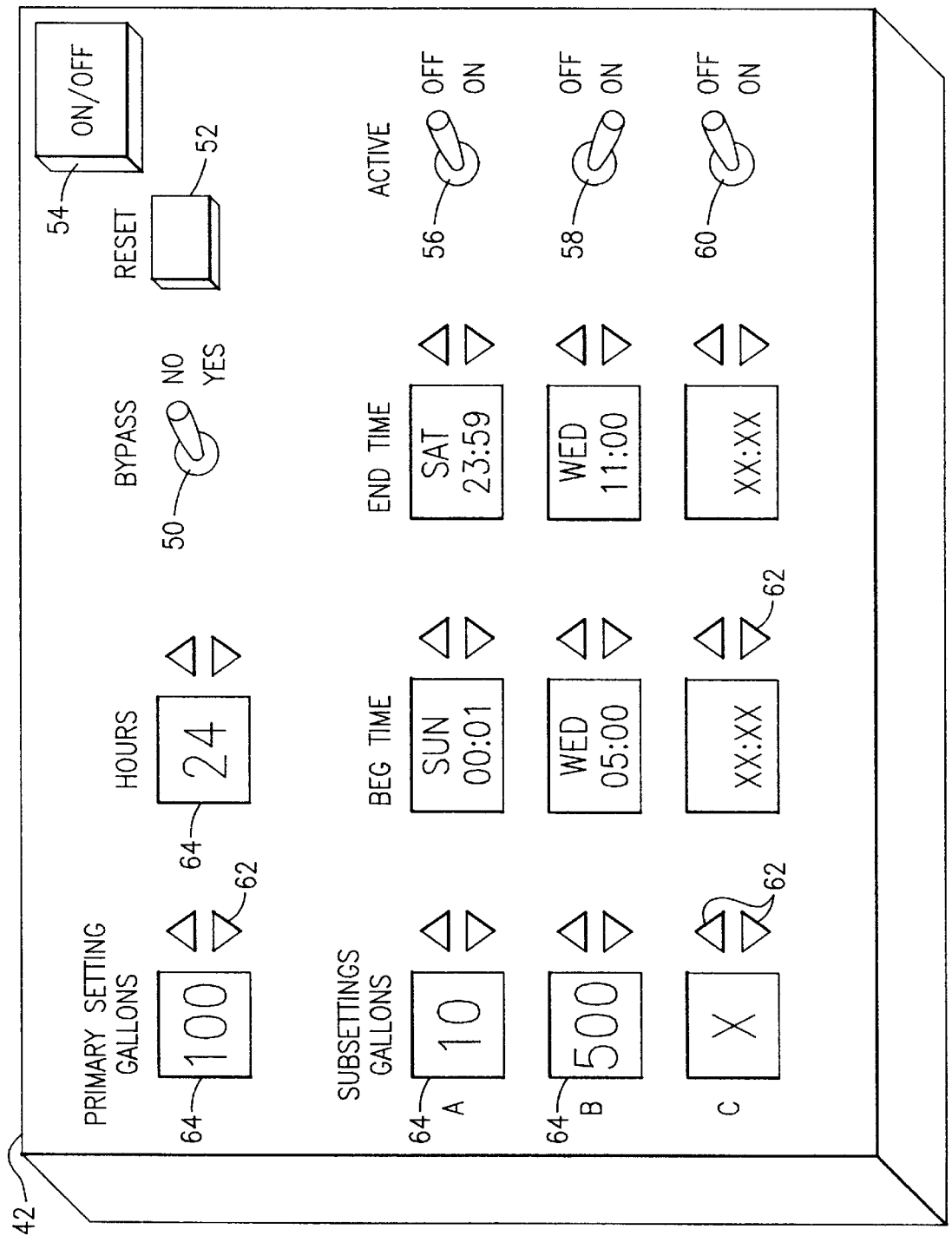
FIG. 4 is a view in perspective of a display panel of settings including switches used to determine subsettings.

A panel 42 is functionally attached to the valve 10 which supplies water usage primary setting and subsetting information to the microprocessor via a second data path 44. The second data path 44 includes as many separate lines, or channels of information, as are required. The panel 42 is shown in FIG. 4, and is discussed in greater detail hereinafter.

The microprocessor 26 includes a built-in clock 46 or, if preferred, a remote clock (not shown) that is functionally connected to the microprocessor 26. The clock 46 includes a real time clock with day of the week information and time of day information as well as a clock that can be reset and which can accumulate an elapsed period of time as desired. Either way the clock supplied information is compared with the time parameters as supplied by the panel 42, and is discussed in greater detail hereinafter.

Referring primarily to FIG. 2, a fault condition such as a leak has been detected by the valve 10 which resulted in a signal being supplied by the microprocessor along the control line 28 to the solenoid 24, which as a result, was energized. The solenoid 24 in turn urged the plunger 20 into a second position which has overcome the force supplied by the first spring 22 which has been further compressed.

As a result of the plunger being moved, the second opening 34 then came into alignment with the pin 30 which was in turn urged through the second opening 34 by the force supplied to it by the second spring 32. This provides a mechanical latching mechanism which keeps the plunger in the second position even if the solenoid 24 is no longer energized. The pin 30 includes a handle 48 which can be manually pulled to overcome the force supplied by the second spring 32 and is used to reset the valve 10 to allow for water to flow again, after the solenoid has been de-energized.

When the plunger 20 is in the second position, the first opening 18 is blocked and water can no longer flow through the valve 10. Although not shown, gaskets may be used where desired in the valve 10 to prevent leaks from occurring as is well known in the arts appertaining to the construction of valves in general.

The valve 10 is normally installed at the beginning of the supply line 12, typically near a water meter (not shown), if it is to be used to control all of the water usage for a particular residence (not shown) or for a commercial building (not shown).

Of course if for some special reason, the valve 10 were to be installed downstream after some primary water usage had first been satisfied for which the valve 10 is not permitted to interrupt, such as for example, to supply water for an automatic fire detection and interior water sprinkler system, that would be an anticipated use and is allowed for by installing the valve 10 in the water supply line 12 immediately after the water supply for the interior sprinkler system has first been accomplished.

Figure 3:
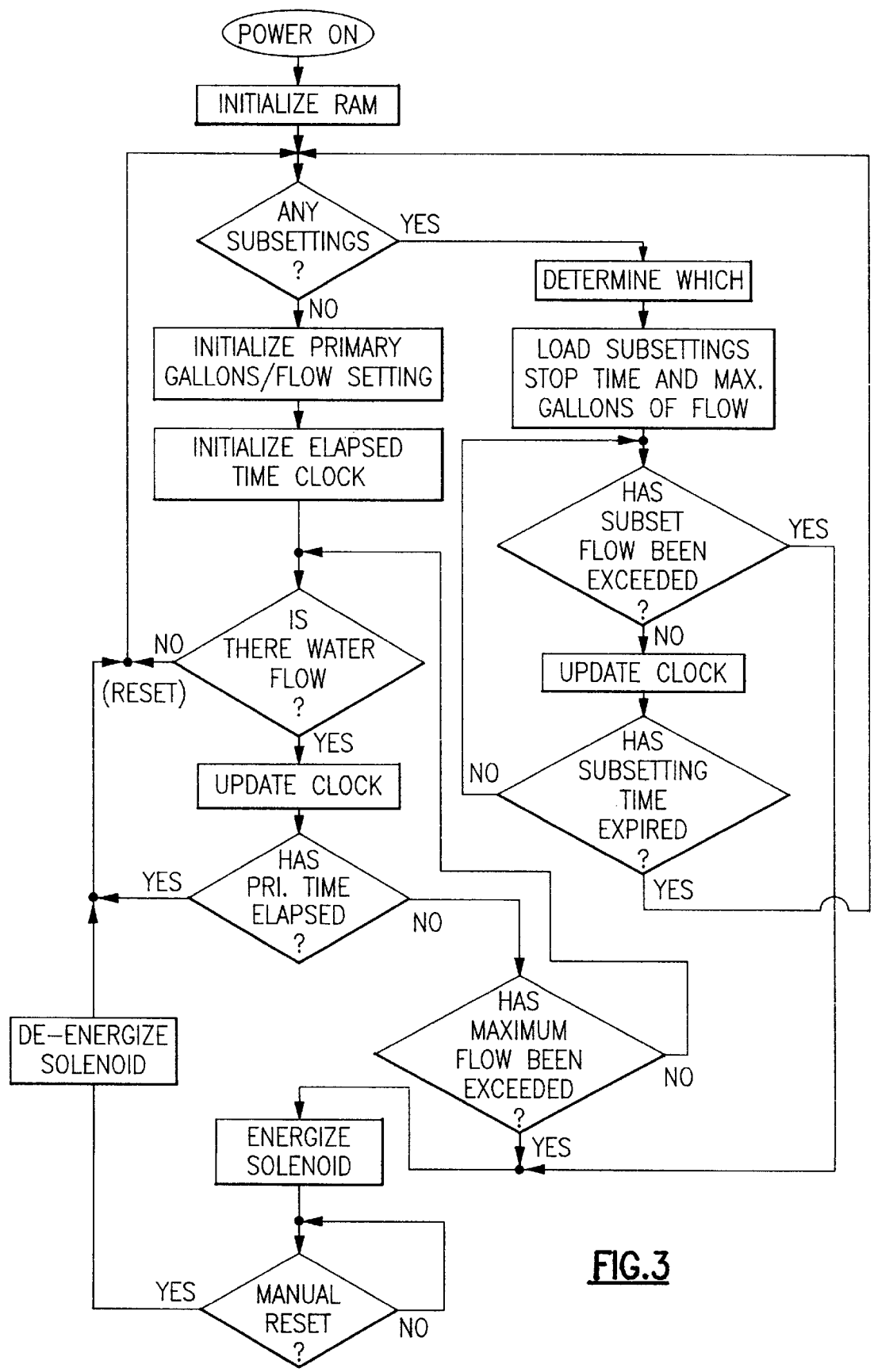
FIG. 3 is a flow chart of microprocessor operations.

Referring now to FIG. 3, is shown a flow chart of microprocessor operations. The valve 10 includes the ability to load primary settings into the microprocessor for normal use. It also includes the ability to load sub-settings which, if enabled, can override the primary settings.

Accordingly, the software is written so as to check to see if any subsettings are active. If so, the parameters based on the subsettings are loaded in memory. The subsetting parameters include a quantity of water within a given real-time frame, and this time interval can be either more or less than that of the primary setting. If no subsettings are active, the primary (main) settings are loaded into memory. In either case, the clock 46 is initialized based on the supplied parameters.

It is suggested to refer on occasion to both FIGS. 3 & 4 simultaneously. As shown, the primary setting is one-hundred gallons of water used in a twenty-four hour time frame. A bypass switch 50 is set to "no" to indicate that none of the subsettings are presently active. In this case "no" means the same as "off" or "not active" or "disabled". Consequently the subsettings, as are discussed in greater detail hereinbelow, are not relied upon regardless of the values that any of the subsettings may contain.

Under these conditions the operating software initializes (resets) the clock 46 to a time period of 24 hours and a maximum flow rate of 100 gallons of water within that time frame. Of course these parameters are widely variable by each user in accordance to the needs of each particular installation, and these amounts are intended only to be exemplary. As none of the subsettings are active, they are not relied upon.

The system then checks for water flow. If there is no flow, then there are no leaks occurring and the system resets itself including the elapsed time clock 46, and the process again begins anew. Therefore the primary elapsed time setting of 24 hours does not correlate directly to real time, such as the time of day but rather represents an interval of relative elapsed time that keeps on starting over whenever the rate of flow becomes zero (no flow).

If there is a flow, the elapsed time is checked to see if 24 hours of continuous flow has occurred. If the time frame has been satisfied, even if there has been a continuous flow for that entire time period that has not exceeded 100 gallons of water usage, the system then resets and the process again begins anew. This type of condition could occur from minor leaks, such as at various fixtures, or from a leaking valve in a toilet tank. The system thereby is tolerant to such conditions as are likely to occur in both residential and commercial use. This tolerance of a minor leakage is an important function of the valve 10 that makes it practical for use in real-life installations where minor leaks may in fact occur.

This capability is only achieved by having a predetermined maximum elapsed time interval to monitor. If there were not a maximum time period (24 hours in this example), then a prior type of a system (not shown) would simply keep on accumulating flow based on the fact that there is a continuous flow of water occurring. This would always result in the steady accumulation of data until the maximum allowable flow is eventually exceeded thereby periodically detecting a fault (leak) when none, in fact is occurring, and in stopping the flow of water unnecessarily. The valve 10 is therefore tolerant to a minor leakage and can prevent annoying water stoppages from occurring needlessly.

If 24 hours of flow has not yet elapsed, the quantity of flow is examined to see if over 100 gallons of usage has occurred. If it has not, the system again checks to see if any flow continues and if so, it then repeats checking to see if the maximum allowable flow has been exceeded. This cycle is repeated until either the time period (24 hours) is exceeded or the maximum allowable quantity of flow (100 gallons) is exceeded. If the time period is first exceeded, the system resets as described above.

If the maximum continuous flow is exceeded within the given time frame, this condition indicates the presence of a fault condition and perhaps a leak and, accordingly, the microprocessor 26 activates the output line 28 which energizes the solenoid 24, thus stopping the flow of water through the valve 10, as is shown in FIG. 2.

The system then waits for a manually induced reset operation to occur, such as by an operator pressing a reset button 52 (optional) or simply cycling a power switch 54 off, then on again. The handle 48 of the pin 30 must also then be pulled out away from the plunger 20 in order to release the plunger 20 and to restart the flow of water through the valve 10.

Referring to the subsettings shown in FIG. 4, in conjunction with the flowchart of FIG. 3, if the bypass switch 50 was instead set to the "yes" (not shown) position, then the three subsettings would be examined to determine which, if any, were active. If none were active, as determined by a first active switch 56, a second active switch 58, and a third active switch 60, then the primary settings would be used exclusively. Similarly if no information was entered for the subsettings then they would not be used to override the primary settings.

If one or more of the subsettings were active, that is the bypass switch 50 is set to "yes" and at least one of the first active switch 56, the second active switch 58, and the third active switch 60 is also set to "on", then these settings are loaded and are used at the appropriate times. More than one subsetting can be used simultaneously. In that case it is preferred that the greater flow rate and the greater time period be used, should there be an overlapping of time periods.

This is not detailed in the flowchart but is included in a function box labeled "determine which" immediately after a "yes" determination of the query, "any subsettings?". The "determine which" operation refers to determining which subsettings are active and noting the real-time parameters of all active subsettings which are compared for possibly overlapping time periods. If there is an overlap, for that portion of time for which the overlapping condition exists, the greater flow rate parameters are used. This type of functionality can be accomplished by any skilled microprocessor programmer.

According to the panel 42 as shown in FIG. 4, the only subsetting that is active is "B". This setting increases the maximum allowable flow of water to five-hundred gallons only on Wednesday mornings between the hours of 5:00 AM and 11:00 AM, presumably to run a lawn sprinkler system (not shown) or the like.

If the bypass switch 50 was set to "yes" (not shown), the system would then conclude that there are subsettings and check the first active switch 56, the second active switch 58, and the third active switch 60 to determine that the only subsetting to be utilized at this time is "B" because the second active switch 58 is set to the "on" position. Accordingly the microprocessor would load the parameters of "B", namely 500 gallons on Wednesday mornings. At all other times of the week, the primary settings would apply. Only on Wednesday mornings would the increased flow be allowed. Otherwise, the system will continue to function as described above and in accordance with the overall flowchart of FIG. 3, except for Wednesday mornings when the subsetting information will be relied upon.

If subsetting "A" were active instead of "B", then from one minute after midnight on Sunday morning, through one minute before midnight on Saturday evening, or all week long, this subsetting would be used. This subsetting drops the maximum allowable flow of water down to under ten gallons per week. Presumably, subsetting "A" would be used when the family was away from the home on vacation and no use, other than slow leaks or drips, are anticipated. Over ten gallons of usage in any week, having continuous flow, will result in a fault condition and will activate the solenoid 20 thus stopping the flow of water through the valve 10.

If both subsettings "A" and "B" were active simultaneously, subsetting "A" would apply for all times of the week except during Wednesday mornings between the hours of 5:00 AM and 11:00 AM when the higher quantity of "B" (500 gallons usage) would be allowed. When two or more subsettings are active simultaneously, the greater flow rate is used, as described above, to resolve an overlapping condition between the subsettings themselves.

However, an active subsetting overrides the parameters of the primary setting even if the quantity of flow of the primary setting is greater than the subsetting. For example, if subsetting "A" were active, it would override the primary setting dropping the maximum allowable quantity of flow down from 100 gallons within a 24 hour period of continuous flow to 10 gallons within an entire week. The small quantity of 10 gallons (when no actual usage is expected) is to allow tolerance for minor leaks, as was discussed hereinabove.

As can be seen the primary setting of twenty-four hours has a relative starting point because it is continually reset to zero and is restarted whenever the flow rate becomes zero (no flow of water). No flow means that no leakage is possible, and that is why the elapsed time is reset. The primary quantity of 100 gallons is measured in comparison to any twenty-four hour period having continuous flow. If it is not exceeded in that time period, the twenty-four hour clock is reset to zero as is the quantity also reset to zero.

The subsettings relate to specific times of the week although they can encompass the entire week if desired, as is shown by subsetting "A". The subsettings reflect real-time parameters instead of elapsed time. They are useful for special events, such as when the family is away on vacation and a decreased usage of water is anticipated, or when an increased usage is expected, such as when lawn sprinklers are to be used or even when a swimming pool is to be filled, if desired. Only the start and stop times and the quantity of the subsettings need be changed to accommodate any special condition affecting water usage.

While three subsettings are shown identified as "A", "B", and "C", each respectively enabled by the first active switch 56, the second active switch 58, and the third active switch 60 respectively, any number can be used. To be effective at least one subsetting is required which can then be set to accommodate any special condition.

In FIG. 4, subsetting "C" has not been used and is set to the default setting (off) which precludes its use.

There is great convenience supplied by the subsettings, once they are programmed by the operator into the valve 10. For example, once subsetting "A", for vacations is programmed, an operator (not shown) need only ensure that the bypass switch 50 is set to "yes" (on) and that the first active switch 56 is set to "on" while the remaining second and third active switches 58, 60 are set to "off". Accordingly, the valve 10 can be set to function in the vacation mode in just a moment by the appropriate setting of a few switches.

Of course electrical power must be supplied to the valve 10. A transformer (not shown) which plugs into source of electrical power (typically a 120 V.A.C. line) is anticipated which will reduce the voltage to an operating level that is effective for the valve 10 and also one which does not present an electrocution hazard to an installer (not shown) or to the operator.

Battery backup is included in the valve 10, if desired. Battery backup may be included with a more expensive (deluxe) model. A deluxe model might also have a greater number of subsettings.

If desired, especially for use with commercial buildings, a plurality of valves 10 may be installed, each one responsible for a portion of the total water usage (consumption) of the building.

There is always the danger that electrical power can be lost. If power is lost after a fault condition has been detected, water flow cannot resume without manual intervention as the pin 30 keeps the plunger 20 in the second position. Battery backup can be used to extend operation in the event a power failure occurs before the valve 10 is able to detect a fault condition. If desired, non-volatile memory may be used to retain all user entered parameters for use during initialization subsequent to the return of electrical power.

The valve 10 allows for close setting of actual water consumption while also accommodating special needs. This allows for optimal safety and minimum damage from a leak in that the valve 10 only permits the amount of continuous flowing water to occur for any time period in accordance with the primary settings.

If it were not for the capability provided by the subsettings it would, according to the maximum parameters of the preceding example, be necessary to allow for five-hundred gallons of flow for any given twenty-four hour period. For Thursday through Tuesday, this would be four-hundred gallons more than the maximum anticipated usage, which is one-hundred gallons. The subsettings do more than merely override the primary settings. As can be seen, they replace the primary setting parameters with new parameters that are dependent upon the day and time of day.

If a leak occurred from Thursday through Tuesday, without the benefit of the presently disclosed subsettings, considerably more water is likely to leak before being detected by a different type of a valve (not shown), and consequently, much more damage is likely to result. The valve 10, as disclosed, minimizes the damage from a leak by minimizing the amount of water that can flow before the leak (fault condition) is detected in accordance with both the primary settings and also in conjunction with the subsettings.

Figure 6:
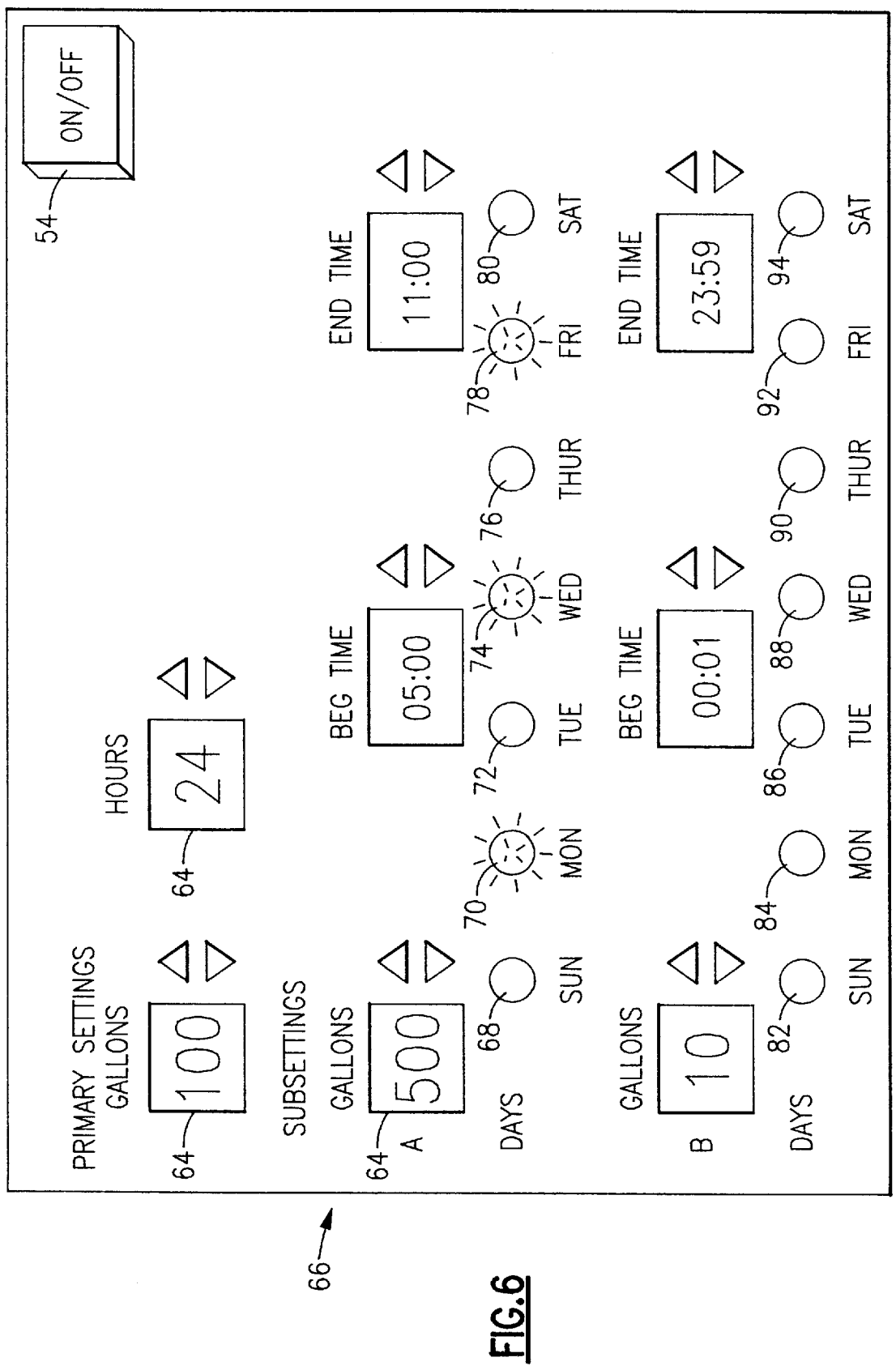
FIG. 6 is an elevational view of a modified display panel.

A plurality of up-down buttons 62 are shown and are used to change any of the operational parameters. Similarly a plurality of displays 64 are shown to indicate the various parameters, as set. Other means (not shown) can of course be used to set and display the operational parameters, as desired. Again, a more deluxe model is likely to have sophisticated display and switch capabilities while a more basic model is likely to have a more basic display and less expensive switches. A modified display panel 66 is shown in FIG. 6 and is discussed in greater detail hereinbelow.

Similarly, a less deluxe model than described may not have the ability to specify exact time frames for specific days of the week. For example, a less deluxe model (not shown) may only be able to be set to five-hundred gallons of flow for all day Wednesday, or perhaps only within any contiguous six hour interval. In either case, the ability to substitute new parameters for the primary settings is accomplished by having at least one subsetting on the valve 10.

Figure 5:
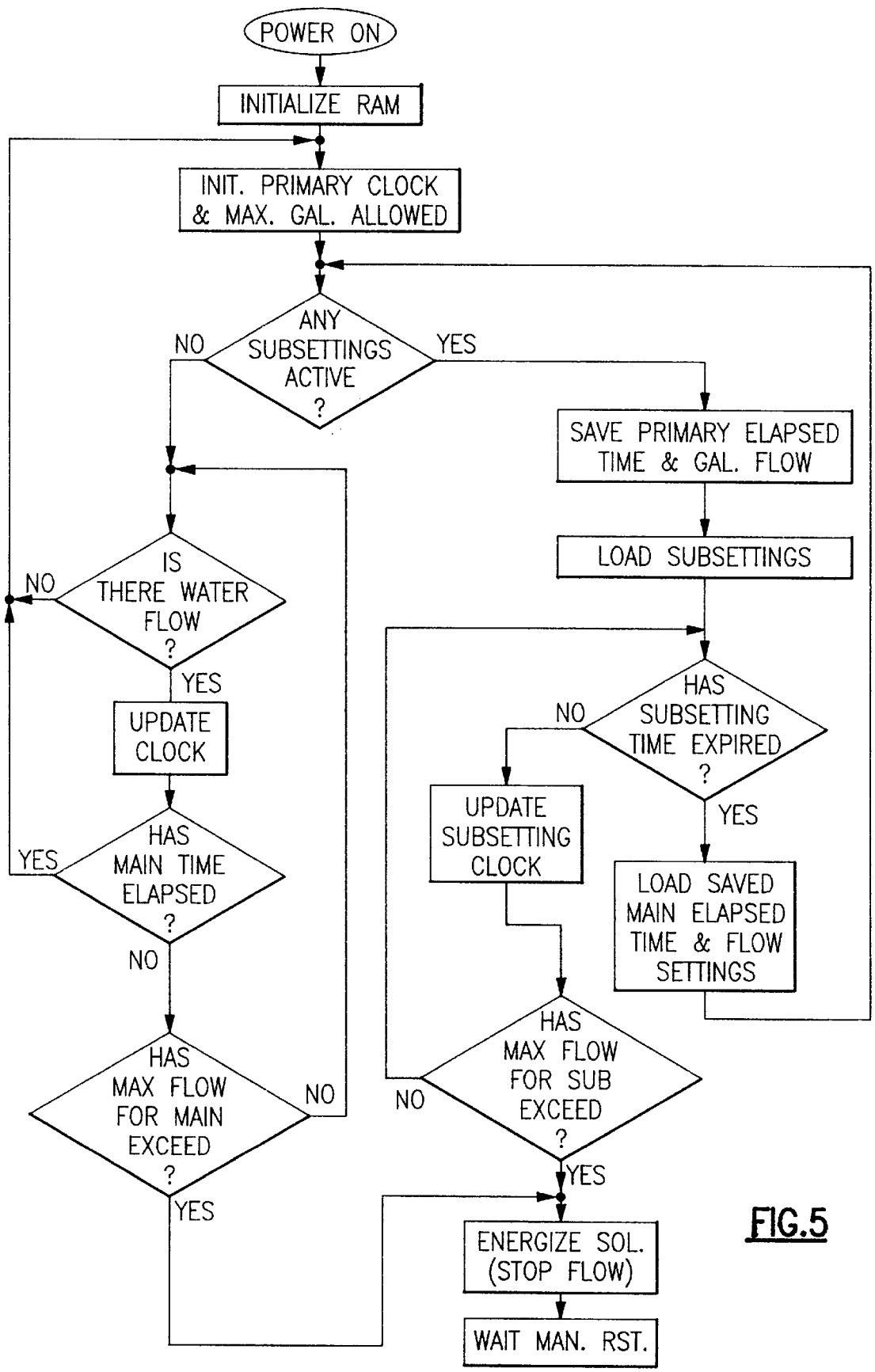
FIG. 5 is a modified flow chart.

Referring now to FIG. 5, is shown a modified flow chart. The modified flow chart is intended to illustrate two principle aspects of the valve 10. The first aspect is that there is latitude by which a skilled programmer can alter the flowchart of FIG. 3 and still achieve similar functioning as is covered by the claims appended hereto.

The second aspect is to illustrate that there is an option presented when reliance upon a subsetting ends and return to the primary setting resumes. The option is whether to reset the primary settings to zero for elapsed primary time and also for accumulated flow of water or to save the accumulated primary settings before using the subsetting parameters and to then restore them after the time period for a subsetting ends.

FIG. 3 illustrates resetting the primary settings to zero and this is an effective approach for many situations. As the valve 10 is intended to minimize the flow of water occurring during a fault condition (i.e. a leak), the application logic of the valve 10, as shown in the FIG. 5 flowchart, has certain advantages and is preferred for use in more deluxe models of the valve 10.

The main differences are that in the modified flowchart upon detection of a subsetting being active, the primary elapsed time and accumulated gallons of water flow are saved until the subsetting time has expired (elapsed). Then, the saved primary data is reloaded and operation of the main program continues in such a manner as to allow the elapsed time information as supplied by the clock 46 to continue to accumulate the primary setting elapsed time from the value that was attained immediately prior to reliance upon the subsetting information. Similarly, the prior accumulated primary gallonage According restored and relied upon.

According to the modified flowchart, the primary setting includes a primary clock which accumulates elapsed time based upon a continuous flow of water through the valve 10. The primary clock is reset to zero whenever no subsetting are active and the flow returns to zero. However the subsetting time information is based upon real time and does not expire until the real time of day information as supplied by the clock 46 no longer matches the time parameters of any of the active subsettings.

When the subsetting time interval has passed and no fault condition (excessive water consumption) has occurred, the elapsed primary clock is not reset to zero but rather to the elapsed time value that was accumulated prior to reliance upon the subsetting.

This can help minimize the quantity of water that is leaking prior to reaching a determination by the valve 10 that a leak is in fact occurring. The ability to make such a determination as soon as possible lessens the quantity of water that escapes from the supply line 12 and therefore minimizes the potential for damage.

This can be illustrated by considering the earlier example as discussed with subsetting "B" once more active at 500 gallons on Wednesday morning between 5:00 AM and 11:00 AM and a primary setting of 100 gallons over 24 hours of elapsed time. There is always latitude built into the gallonage. It is an estimated amount that must include more flow than is normally anticipated.

For example the 500 gallon figure is reasonable when only about 350 gallons are normally used by the sprinklers. The extra amount allows leeway for normal water usage to occur simultaneous with the sprinkling of the lawn and also to allow for variations in usage by the sprinklers as will occur in proportion to changing pressures in the water system.

For example if the supply line 12 is normally at 50 pounds per square inch pressure, it will nevertheless experience fluctuations in pressure from time to time as occur with municipal water systems and even with private (residential) water systems. If the supply line 12 pressure happens to be at 60 pounds per square inch pressure on Wednesday morning there would be a proportionate increase in flow through the sprinklers which must be allowed for by the subsetting parameters.

If a leak occurred before the subsetting "B" time expired, say at 10:00 AM, and the leak was occurring at a rate of 100 gallons per hour, then the water usage of the subsetting would be at 450 gallons (the normal 350 plus the 100 gallons that has leaked). This would not be detected as a fault condition by the subsetting as it is still below the permissible 500 gallons.

If upon return to the primary settings the elapsed primary time is set to zero as is the elapsed time, then 100 gallons of flow must occur before a leak is detected (as this is the primary setting). If no other water usage is occurring, then all of this is in the form of leakage. Accordingly, a total of 200 gallons of leaking would occur before detection and shutdown by the valve 10 occurred.

If the primary setting immediately prior to reliance upon subsetting "B" had been saved, and if that amount was 70 gallons in 20 hours, then a remaining time period of 4 hours of continuous flow would remain with a maximum allowable quantity of flow within that time period of 30 gallons. If these parameters were restored and relied upon after the conclusion of subsetting "B", then the leak would be detected after an additional 30 gallons of flow occurred.

The total maximum amount of water leaking would, in this case, be 130 gallons before detection and the subsequent shutdown of the water flow by the valve 10 occurs. This would be 70 gallons less leakage than would have otherwise occurred. It can be readily seen that saving and then restoring the primary setting parameters before and after reliance of a subsetting can minimize water damage.

Referring now to FIG. 6, a modified display panel 66 is shown which, corresponding with subsetting "A", includes a lighted day switch 68, 70, 72, 74, 76, 78, 80 that corresponds with each day of the week beginning with Sunday, respectively. Each lighted day switch 68, 70, 72, 74, 76, 78, 80 is ideally a push-on, push-off type of switch that is pushed once to the on position which is retained until it is pushed again after which it returns to the off position.

When in the on position, a built-in lamp illuminates. Of course, other types of switches (not shown) may be used with remote indicator lamps if desired.

In the FIG. 6 drawing, lighted day switches 70, 74, and 78 are each set to the "on" position and are each respectively illuminated. This corresponds with days of the week Monday, Wednesday, and Friday, respectively, each day being set to "on".

The use of the lighted day switches 68, 70, 72, 74, 76, 78, 80 eliminates the need for the first active switch 56, the second active switch 58, and the third active switch 60 as shown in FIG. 4, because the subsetting is made active for each day that is selected by each respective lighted day switch 68, 70, 72, 74, 76, 78, and 80.

The utility of the subsettings is also increased as is ease of use of the valve 10. For example if, according to the display panel of FIG. 4, it is desired to operate the sprinklers on Monday, Wednesday, and Friday, then subsettings "A", "B", and "C" would each have to be so programmed. This would increase the burden on the operator in that he would have to reprogram the valve 10 for each of the three days. Accordingly, the three subsettings "A", "B", and "C" would each be used only to establish the use of the sprinklers on those days leaving no subsetting available for the vacation mode. A fourth subsetting "D" (not shown) would be required increasing the complexity of the valve 10 or the operator would not be able to water the lawn for more than two days each week.

According to the modified display panel 66, the subsetting "A" gallonage (500) is only entered once as are the start and stop times (beginning and ending times). Then the operator merely depresses the lighted day switches 68, 70, 72, 74, 76, 78, 80 for any day he wants the subsetting active which would correspond with the days he intends to water his lawn.

In the example shown, he would depress lighted day switches 70, 74, and 78 if he wanted to water the lawn on Monday, Wednesday, and Friday, respectively. If he wanted to briefly water the lawn on each day he would select a shorter start and stop time and a lesser gallonage and he would then depress all of the lighted day switches 68, 70, 72, 74, 76, 78, 80 thus selecting them for every day of the week.

To change days is as easy as selecting the lighted day switches 68, 70, 72, 74, 76, 78, 80 for the days he wants this subsetting to be active and deselecting it for the days he does not want it active. The fact that each of the lighted day switches 68, 70, 72, 74, 76, 78, 80 illuminates when selected makes selecting and deselecting the switches especially easy to accomplish.

According to the modified display panel 66, subsetting "B" is the vacation mode setting. If the operator were to go on vacation and he did not want the sprinklers to operate while he was away, he would simply depress the lighted day switches 70, 74, and 78 to deselect them thereby verifying that all of the lighted day switches 68, 70, 72, 74, 76, 78, 80 under subsetting "A" were off and he would then depress any of the lighted day switches under subsetting "B" (82, 84, 86, 88, 90, 92, and 94) that would correspond with the days of the week that he will be on vacation.

When he returns from vacation, he simply reverses the procedure. If he also wanted the sprinklers to operate on Monday, Wednesday, and Friday while he was away on vacation he would leave the lighted day switches 70, 74, and 78 on while he simultaneously selected (turned on) the lighted day switches under subsetting "B" (82, 84, 86, 88, 90, 99, and 94) that would correspond with the days of the week that he will be on vacation.

The above teachings may be combined as desired. For example, the bypass switch 50 of the panel 42 of FIG. 4 may be added to the modified display panel 66 of FIG. 6 as a rapid way to either enable or disable all of the subsettings at once. Similarly, the subsetting scheme as shown in the panel 42 of FIG. 4 may control certain of the available subsettings and be combined with the lighted day switches 68, 70, 72, 74, 76, 78, 80 of the modified display panel 66 of FIG. 6 which may control certain other of the subsettings, thereby providing the valve 10 with even greater versatility and ease of use.

In addition, the above teachings anticipate significant flexibility of implementation. For example, the panel 42 is intended to display pertinent information including primary and subsetting information and to also include the various switches, as have been described and referenced hereinabove, which control the operation of the valve 10. This applies equally as well to the modified display panel 66.

Flexibility permits physical mounting of the panel 42 or the modified display panel 66 either directly to the valve 10 (where the valve 10 is physically attached to the supply line 12) or at a remote location that is deemed to provide easier access. Each approach is viable and includes certain inherent benefits. Direct attachment of either the panel 42 or the modified display panel 66 to the valve 10 anticipates ease of installation and lower cost, both in terms of the cost of manufacturing and the added cost of installation, whereas remote mounting anticipates greater ease of use of the valve 10.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A water shut-off and leak detection system for use with a conduit, comprising:
    (a) a microprocessor including a program memory and an alterable data memory;
    (b) an elapsed time clock coupled to said microprocessor, said elapsed time clock adapted to be reset by said microprocessor;
    (c) a primary setting consisting of a predetermined quantity of water and a predetermined period of elapsed time, said primary setting supplied to said microprocessor;
    (d) a valve adapted to be disposed intermediate said conduit, said valve including a first position adapted to permit the flow of water therein to occur and a second position adapted to prevent the flow of water therein, and including means for electrically connecting said microprocessor to said valve, said means for electrically connecting including means for urging said valve from said first position to said second position in response to a control signal from said microprocessor; and
    (e) a flowmeter operably attached to said valve, said flowmeter adapted to provide a continuous indication of the rate of fluid flow to said microprocessor;
    wherein said control signal is generated by said microprocessor in response to a continuous flow of water exceeding said predetermined quantity of water within said predetermined period of time,
    and wherein said elapsed time clock is reset to zero to begin accumulating anew subsequent to accumulating a duration of time equal to said predetermined period of time during a continuous flow of water that has not exceeded said predetermined quantity of water within said predetermined period of time and correspondingly, said quantity of fluid flow is reset to zero to begin accumulating anew when said elapsed time clock is reset to zero.

2. A water shut-off and leak detection system for use with a conduit, comprising:
    (a) a microprocessor including a program memory and an alterable data memory;
    (b) a real time clock electronically coupled to said microprocessor and which is adapted to provide day of the week information to said microprocessor;
    (c) an elapsed time clock coupled to said microprocessor, said elapsed time clock adapted to be reset by said microprocessor;

(d) a primary setting consisting of a first predetermined quantity of water and a first predetermined period of elapsed time, said primary setting supplied to said microprocessor;

(e) at least one subsetting consisting of a second predetermined quantity of water and a second predetermined period of time said at least one subsetting supplied to said microprocessor;

(f) a valve adapted to be disposed intermediate said conduit, said valve including a first position adapted to permit the flow of water therein to occur and a second position adapted to prevent the flow of water therein, and including means for electrically connecting said microprocessor to said valve, said means for electrically connecting including means for urging said valve from said first position to said second position in response to a control signal from said microprocessor;

(g) a flowmeter operably attached to said valve, said flowmeter adapted to provide a continuous indication of the rate of fluid flow to said microprocessor and wherein said microprocessor is adapted to accumulate a quantity of fluid flow within said first predetermined period of time and within said second predetermined period of time; and (h) means for latching said valve in said second position, wherein said control signal is generated by said microprocessor in response to a continuous flow of water exceeding said first predetermined quantity of water within said first predetermined period of time and wherein said elapsed time clock is reset to zero to begin accumulating anew subsequent to accumulating a duration of time equal to said second predetermined period of time during a continuous flow of water that has not exceeded said second predetermined quantity of water within said second predetermined period of time and correspondingly, said quantity of fluid flow is reset to zero to begin accumulating anew when said elapsed time clock is reset to zero.

3. The water shut-off and leak detection system of claim 2 wherein said control signal is generated by said microprocessor in response to a continuous flow of water exceeding said second predetermined quantity of water within said second predetermined period of time.

4. The water shut-off and leak detection system of claim 2 wherein said valve includes a plunger, said plunger having a first opening therein and wherein said first and said second positions of said valve correspond respectively with a first and a second position of said plunger.

5. The water shut-off and leak detection system of claim 4 wherein said first opening is adapted to permit water to flow therein in said first position and to prevent water from flowing therein in said second position and including a first spring, said first spring adapted to supply a force to urge said plunger toward said first position.

6. The water shut-off and leak detection system of claim 5 wherein said means for latching said valve in said second position includes a second opening in said plunger, said second opening being adapted to receive a pin therein in said second position, said pin including a second spring, said second spring adapted to urge said pin toward said plunger and into said second opening.

7. The water shut-off and leak detection system of claim 6 wherein as said pin is urged into said second opening in said second position, said plunger is maintained in said second position until acted upon by an operator.

8. The water shut-off and leak detection system of claim 7 including a handle attached to said pin, said handle adapted to permit release of said pin from said second opening by said operator.

9. The water shut-off and leak detection system of claim 2 including means for coupling said system to said conduit.

10. The water shut-off and leak detection system of claim 2 including at least one display.

11. The water shut-off and leak detection system of claim 2 including at least one switch.

12. The water shut-off and leak detection system of claim 2 including a source of electrical power.

13. The water shut-off and leak detection system of claim 12 wherein said source of electrical power includes a back-up battery.

14. The water shut-off and leak detection system of claim 2 wherein said quantity of fluid flow is reset to zero to begin accumulating anew subsequent to said elapsed time clock accumulating a duration of time equal to said second predetermined period of time.

15. The water shut-off and leak detection system of claim 2 wherein said elapsed time clock is reset to an accumulated value attained by said primary setting prior to a reliance of said at least one subsetting subsequent to said elapsed time clock accumulating a duration of time equal to said second predetermined period of time.

16. The water shut-off and leak detection system of claim 2 wherein said quantity of fluid flow is reset to an accumulated value attained by said primary setting prior to a reliance of said at least one subsetting subsequent to said elapsed time clock accumulating a duration of time equal to said second predetermined period of time.

17. The water shut-off and leak detection system of claim 2 including means for converting the output from said flowmeter into a form usable by said microprocessor.

18. The water shut-off and leak detection system of claim 2 including means for selecting said at least one subsetting corresponding with each day of the week.

19. The water shut-off and leak detection system of claim 2 including a panel, said panel including at least one means for displaying and at least one means for providing a switch.

20. The water shut-off and leak detection system of claim 19 wherein said panel is installed proximate the location of said valve.

21. The water shut-off and leak detection system of claim 19 wherein said panel is installed at a remote location with respect to the location of said valve.

22. The water shut-off and leak detection system of claim 2 wherein said elapsed time clock is reset to zero to begin accumulating anew subsequent to said elapsed time clock accumulating a duration of time equal to said first predetermined period of time.

23. The water shut-off and leak detection system of claim 2 wherein said quantity of fluid flow is reset to zero to begin accumulating anew subsequent to said elapsed time clock accumulating a duration of time equal to said first predetermined period of time.

24. A water shut-off and leak detection system for use with a conduit, comprising:

(a) a microprocessor including a program memory and an alterable data memory;

(b) an elapsed time clock coupled to said microprocessor, said elapsed time clock adapted to be reset by said microprocessor;

(c) a primary setting consisting of a predetermined quantity of water and a predetermined period of elapsed time, said primary setting supplied to said microprocessor;

(d) a valve adapted to be disposed intermediate said conduit, said valve including a first position adapted to permit the flow of water therein to occur and a second position adapted to prevent the flow of water therein, and including means for electrically connecting said microprocessor to said valve, said means for electrically connecting including means for urging said valve from said first position to said second position in response to a control signal from said microprocessor; and (e) a flowmeter operably attached to said valve, said flowmeter adapted to provide a continuous indication of the rate of fluid flow to said microprocessor;

wherein said control signal is generated by said microprocessor in response to a continuous flow of water exceeding said predetermined quantity of water within said predetermined period of time;

and wherein said elapsed time clock is reset to zero to begin accumulating anew subsequent to accumulating a duration of time equal to said predetermined period of time during a continuous flow of water that has not exceeded said predetermined quantity of water within said predetermined period of time, and correspondingly, said quantity of fluid flow is reset to zero to begin accumulating anew when said elapsed time clock is reset to zero.

* * * * *